United States Patent [19]
Ballard

[11] 3,916,513
[45] Nov. 4, 1975

[54] FORMING INTERCONNECTIONS BETWEEN CIRCUIT LAYERS

[75] Inventor: Nathan Thomas Ballard, Santa Monica, Calif.

[73] Assignee: Ampex Corporation, Redwood City, Calif.

[22] Filed: May 3, 1974

[21] Appl. No.: 466,549

[52] U.S. Cl. ....................... 29/625; 29/626; 29/627; 29/628; 174/68.5; 264/139; 264/162; 264/277

[51] Int. Cl.² ........................................... H05K 1/04

[58] Field of Search ............. 29/624, 625, 626, 627, 29/629, 630 D, 628; 174/68.5; 317/101 B, 101 CP; 264/139, 162, 272, 277

[56] References Cited

UNITED STATES PATENTS

| | | | |
|---|---|---|---|
| 2,948,051 | 8/1960 | Eisler | 264/139 X |
| 3,079,672 | 3/1963 | Bain et al. | 29/625 |
| 3,466,206 | 9/1969 | Beck | 29/625 X |
| 3,517,437 | 6/1970 | Szobonya | 29/625 X |
| 3,552,004 | 1/1971 | Hagelbarger et al. | 29/625 |
| 3,559,285 | 2/1971 | Kauffman | 29/626 X |
| 3,618,207 | 11/1971 | Sand et al. | 29/629 |
| 3,636,235 | 1/1972 | Williams | 29/624 X |
| 3,641,254 | 2/1972 | Bunting et al. | 29/626 X |
| 3,747,209 | 7/1973 | Chow | 29/629 |
| 3,775,844 | 12/1973 | Parks | 29/625 X |
| 3,791,025 | 2/1974 | Guarjado | 29/627 X |
| 3,795,037 | 3/1974 | Luttmer | 29/629 X |
| 3,795,884 | 3/1974 | Kotaka | 29/629 X |

*Primary Examiner*—C. W. Lanham
*Assistant Examiner*—Joseph A. Walkowski

[57] ABSTRACT

Interplane connectors (vias) between circuit layers are fabricated by providing a metal base plate with the desired connectors thereon, forming the connectors at right angles to the base plate and embedding the connectors in a plastic matrix. The base plate is then removed, leaving the plastic with the connectors embedded therein at the desired locations.

2 Claims, 12 Drawing Figures

FORMING INTERCONNECTIONS BETWEEN CIRCUIT LAYERS

The invention herein described was made in the course of a contract with the United States Navy.

SUMMARY OF THE INVENTION

In the formation of multiple layer structures, such as closed flux memories, printed circuits, hybrid circuits and the like, it is necessary to provide for interconnections from one layer to another. These connectors must be accurately placed and the packing density is preferably high to achieve satisfactory results. Various means have been proposed such as those used in the manufacture of typical multiple layer printed circuits or multiple layer ceramic circuits but many such methods require manual manipulation of the intercircuit connection and thus large amount of labor to form the large number of interconnections required, and/or are limited to low connection densities or over small linear dimensions.

The present invention provides a method of making interlayer circuit connections on a volume basis with a minimum expenditure of labor, uncomplicated processing and low cost materials and thus at a very reasonable cost. The technique of the present invention permits these connectors to be made at a high density and permits them to be made through great separation thicknesses and over large dimensions.

Thus, the present invention not only permits relatively long interlayer connections but provides a high packing density as well as an almost complete absence of manual manipulation so that the labor cost is very low. The technique of the present invention permits such connections to be made to an accuracy of about 0.001 inches over dimensions of many inches.

The interconnection process of the present invention yields thermally stable and mechanically stable connections between various circuit planes.

Various other advantages of the present invention will be brought out in the balance of the specification.

DESCRIPTION OF THE PREFERRED EMBODIMENTS

Figures 1A, 1B, 1C, 1D, 1E, 2:
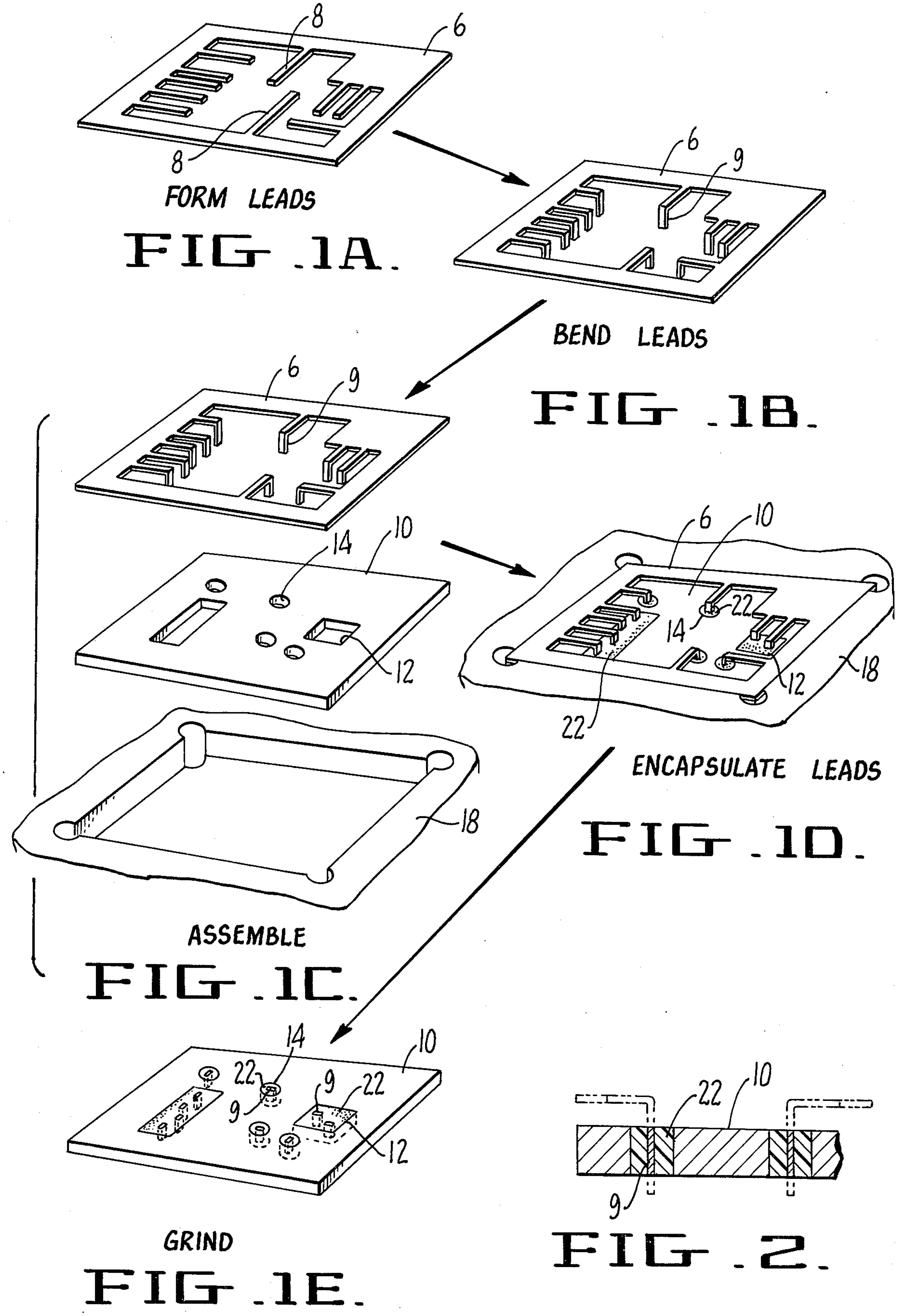
FIGS. 1A–1E consist of a series of views showing the method of forming leads or vias in accordance with the technique of the present invention.
FIG. 2 is a sectional view of an interlayer connector fabricated in accordance with the present invention.
Figure 3A:
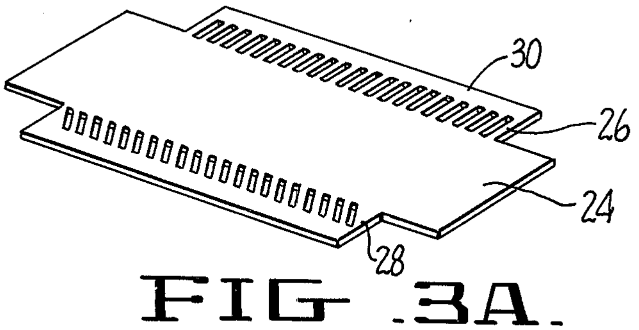
FIGS. 3A–3C show a series of steps in fabricating leads which are particularly suitable for use in a closed flux memory structure.
Figure 3B:
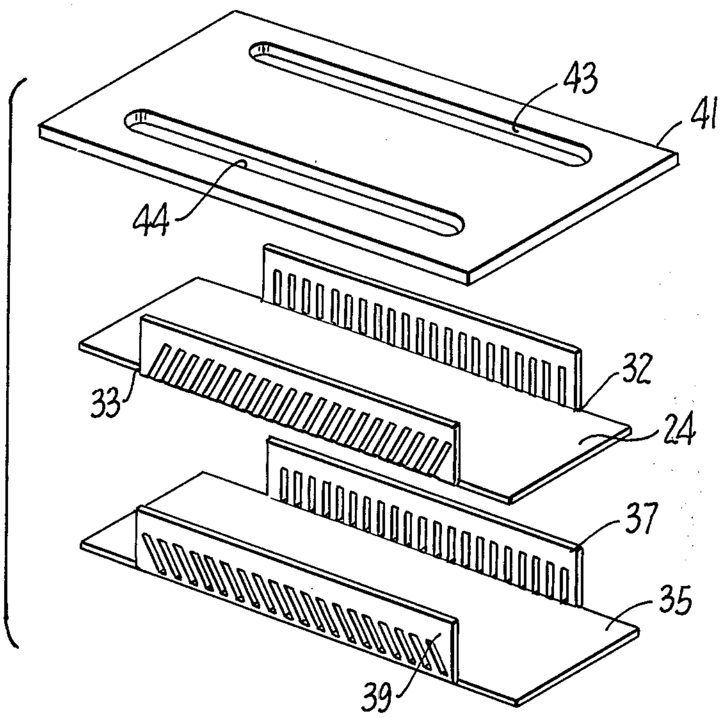
Figure 5:
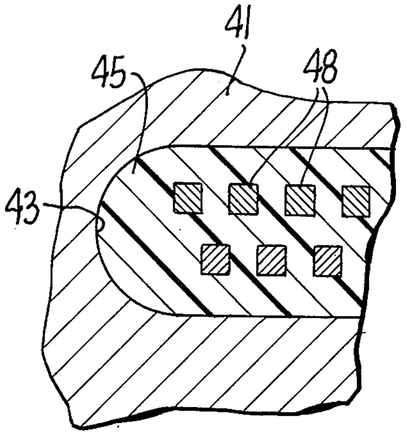
FIG. 5 is a section on the line 5—5 of FIG. 4.
Figure 3C:
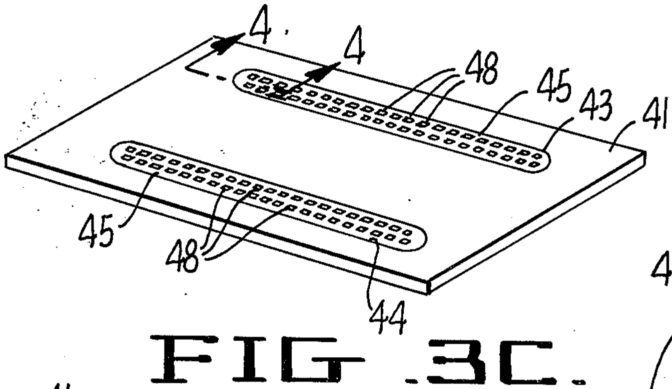

Referring now to the drawings by reference characters, particularly that embodiment of the invention shown in FIGS. 1 and 2, a metal plate or lead frame 6 is first fabricated with a number of fingers 8 extending from it. The plate is fabricated of a metal which is suitable for use for the interconnectors and the fingers are fabricated at the sites required for registering with the required circuitry after bending. The fingers can be formed by any process such as stamping where maximum economy for mass production is required but to achieve maximum packing density must be formed by masking and chemical etching techniques well known to those skilled in the art. It will be understood, of course, that the number of fingers shown in FIG. 1A represents a highly simplified example and that in most complex structures, many more such fingers would be employed.

The plate 6 is then placed in a forming die and the ends of the fingers bent downwardly as is shown in FIG. 1B. The fingers are bent at an angle of 90° to the plate and the location of the bent down fingers must be in the precise locations required to form the ultimate interlayer structure. Also, the lengths of the bent down portions of the fingers must be at least equal to the thickness of the ultimate multiple layer structure. In some electronic applications, a metal substrate is employed such as in a CFM where a close ground plane is desirable and this invention provides for such substrates by providing dielectric isolation of the interconnects from the substrate, however any desired substrate may be employed or as is brought out further on the substrate may be formed in the fabrication sequence if a plastic substrate is desirable. In FIG. 1C there is shown a substrate 10 having a plurality of openings as at 12 and 14 through which the interconnectors can pass without touching. In this embodiment of the invention some of the openings as at 12 are large enough to permit a plurality of the connectors to pass therethrough with clearance at the edges while other openings such as at 14 are only large enough to pass a single connector with the necessary clearance. As is shown in FIG. 1C, plate 6 is superimposed on the substrate 10 and the substrate and lead frame placed in an insert mold 18 providing appropriate registration. The mold is then closed and plastic is forced into the cavities in the substrate, surrounding the vertical leads of the lead frame and permanently locking them into the substrate. Suitable runners are provided, not shown, as is well known to those skilled in the art so that the plastic flows into all of the desired places.

This produces the structure shown in FIG. 1D wherein the substrate 10 is firmly locked to the lead plate 6 by means of the plastic 22 surrounding the downturned ends 9 of the fingers. The hardened structure is now removed from the mold and the frame 6 as well as the excess length of the fingers is removed by milling, grinding or other similar procedure. This leaves the structure shown in FIGS. 1E and 2 which show the substrate 10 having plastic inserts 22 and the bound interconnectors 9. That portion of the original plate and fingers shown in dot-dash lines in FIG. 2 has been removed by the milling, grinding or other similar operation. Thus, one now has a plate of a suitable substrate with a plurality of insulated vias extending from one side of the plate to the other. A circuit can now be formed on the substrate by metal depositing, photomasking and the like on both sides of the substrate to form the desired electronic circuit with the interconnectors connecting one side of the circuit to the other.

A somewhat modified form of this technique which is particularly suitable for use in fabricating closed flux memory circuits is shown in FIGS. 3 through 6. In such application a base substrate such as aluminum is used with two rows of metal interconnectors on each side of the substrate. In such interconnectors it is frequently desirable to have some of the connectors running at right angles to the substrate while other cross-over connectors run at an angle thereto. Thus, in contrast with the embodiment shown in FIGS. 1 and 2 where all the connectors run at right angles to the substrate, in this embodiment of the invention some of the connectors run at an angle thereto to make a cross-over connector. Further, in the embodiment shown in FIG. 1, a single base plate having the turned-up fingers was shown but in this embodiment two base plates are used which nest within each other. This technique is particularly desirable when a large number of parallel interconnectors is required and, of course, more than two nested plates can be employed. Thus, referring specifically to the drawings, a base plate 24 is fabricated, having a series of fingers formed at the edge thereof, namely, the fingers 26 which extend at right angles to the major axis of the plate and the fingers 28 which extend at an angle thereto. Also, it will be noted that in this embodiment of the invention, the fingers are not free at their ends but are held by an outer strip of metal 30. By forming the fingers in this way the stability of the structure is much enhanced since the ends of the fingers are held in a rigid relationship to each other. The base plate is then further fabricated by bending the edges up in a forming die on the lines 32 and 33. A second base plate 35 is similarly fabricated having upturned edges 37 and 39 and is formed as before. Plate 24 will nest within plate 35. A substrate 41 is provided of aluminum, or other suitable material, having slots 43 and 44 therein; each slot is sized suitably to receive two rows of vias. Lead frames 24 and 35 are now nested and the upturned edges placed through the slots 43 and 44. The assembled structure is now placed in a die in the same manner as was shown in connection with FIG. 1 and plastic poured or forced into the die and set. The structure is now removed from the die and both sides of the substrate 41 are machined, milled or otherwise treated to produce the structure shown in FIGS. 3C, 4 and 5 wherein two rows of vias 48 are embedded in the plastic 45. As will be seen from the drawings, the vias are insulated from each other and from the substrate.

Figure 6:
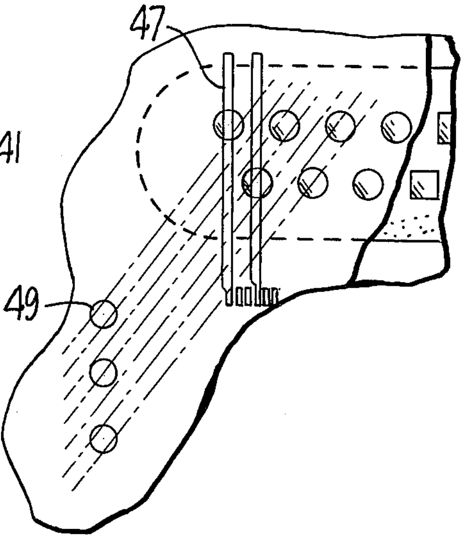
FIG. 6 is a partial plan view of a closed flux memory unit fabricated over vias made in accordance with the present invention.
Figure 4:
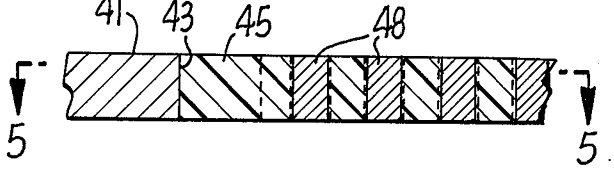
FIG. 4 is a section on the line 4—4 of FIG. 3C.

In FIG. 6 there is shown a finished closed flux memory structure fabricated on a substrate produced in accordance with the present invention. The substrate has been cleaned, activated and the desired locations such as the vias, selectively plated in gold or the entire surface may be plated and the necessary electrical isolation provided by etching, and then a thin sheet of dielectric is laminated over both surfaces. Holes have been etched down to the vias and closed flux memory lines 47 formed over the vias while other holes 49 have been formed in the plastic for connection to the ground plane of gold. This series of steps has not been described in detail since it is well known to those skilled in the art and is mentioned only as an illustration of how the structure of the present invention can be utilized.

The interconnecting vias can be fabricated of any suitable metal such as aluminum, copper or the like. Of course proper consideration must be given to all elements of the structure to insure compatibility of physical material properties such as rates of thermal expansion. The plastic which is used to encapsulate the vias can be any plastic which is stable at the temperature at which the structure is to be used. Preferably plastics having a high thermal stability and having a coefficient of expansion similar to that of the vias metal and substrate are employed; plastics such as polyimides, thermoset silicone resins, glass fiber loaded silicone resins and the like are all suitable.

Although in most electronic applications a preformed substrate will be employed with the vias passing therethrough, it is also possible to use the technique of the present invention by forming a plastic substrate in situ around the vias. Thus, the substrate 10 shown in FIG. 1 or the substrate 41 shown in FIG. 3 could be eliminated and plastic formed around the vias and hardened. The plastic plate is then machined, ground, or otherwise treated to produce a plastic substrate with the vias passing therethrough. Many other variations can be made in the exact technique described without departing from the spirit of this invention.

I claim:

1. The method of fabricating a conductive, flat substrate suitable for use in a multiple layer electronic structure, said substrate having two generally parallel flat sides, having a plurality of vias extending from one flat side of the substrate to the opposite parallel flat side, said vias being insulated from the conductive substrate and being held in a matrix of plastic material, comprising the following steps:

a. providing a conductive substrate having holes therein extending from side-to-side corresponding to the placement of the desired vias, b. forming at least one metal plate having a series of fingers thereon, said fingers corresponding to a desired via configuration, c. bending said fingers at an angle to said plate and placing said plate over said substrate whereby the bent over fingers extend through the holes of the conductive substrate without touching the same, d. placing said plate and said substrate in an insert mold and flowing plastic into said holes around said fingers, e. causing said plastic to set, and f. removing excess portions of the fingers from both sides of said substrate to provide a completed flat substrate having a plurality of insulated vias extending from one surface of said substrate to the opposite surface of said substrate.

2. The method of claim 1 wherein a plurality of nesting plates are employed, each having fingers extending therefrom.

* * * * *